US00RE36780E

United States Patent [19]

Kozakiewicz et al.

[11] E Patent Number: Re. 36,780

[45] Reissued Date of Patent: Jul. 18, 2000

[54] MANNICH ACRYLAMIDE POLYMERS

[75] Inventors: Joseph J. Kozakiewicz; Sun-Yi Huang, both of Stamford, Conn.

[73] Assignee: Cytec Technology Corp., Wilmington, Del.

[21] Appl. No.: 08/993,360

[22] Filed: Dec. 18, 1997

Related U.S. Patent Documents

Reissue of:

[64] Patent No.: 5,132,023
Issued: Jul. 21, 1992
Appl. No.: 07/697,049
Filed: May 8, 1991

U.S. Applications:

[60] Continuation of application No. 08/274,181, Jul. 12, 1994, abandoned, which is a division of application No. 07/535,791, Jun. 11, 1990, Pat. No. 5,037,881, which is a division of application No. 07/428,730, Oct. 30, 1989, Pat. No. 4,956,399, which is a continuation-in-part of application No. 07/285,927, Dec. 19, 1988, abandoned.

[51] Int. Cl.[7] ..... C02F 1/56

[52] U.S. Cl. ..... 210/734; 210/928; 524/922

[58] Field of Search ..... 210/609, 725, 210/727, 728, 734, 928; 524/827, 829, 831, 922

[56] References Cited

U.S. PATENT DOCUMENTS

| | | | |
|---|---|---|---|
| 2,937,143 | 5/1960 | Goren | 210/728 |
| 3,142,638 | 7/1964 | Blaisdell et al. | 210/728 |
| 3,165,465 | 1/1965 | Ray et al. | 210/727 |
| 3,235,490 | 2/1966 | Goren | 210/728 |
| 3,259,569 | 7/1966 | Priesing et al. | 210/46 |
| 3,276,988 | 10/1966 | Williams | 204/284 |
| 3,284,393 | 11/1966 | Vanderhoff et al. | 260/29.6 |
| 3,380,947 | 4/1968 | Galgoczi et al. | 260/29.6 |
| 3,536,646 | 10/1970 | Hatch et al. | 260/29.2 |
| 3,539,535 | 11/1970 | Wisner | 260/72 |
| 3,556,932 | 1/1971 | Coscia et al. | 162/166 |
| 3,624,019 | 11/1971 | Anderson et al. | 260/29.6 H |
| 3,640,897 | 2/1972 | Restaino | 252/412 |
| 3,719,748 | 3/1973 | Manfroy et al. | 423/544 |
| 3,732,184 | 5/1973 | Lindemann et al. | 260/77.5 |
| 3,734,873 | 5/1973 | Anderson et al. | 260/29.6 H |
| 3,790,529 | 2/1974 | Fujimura et al. | 260/72 R |
| 3,840,489 | 10/1974 | Strazdins | 260/29.6 TA |
| 3,864,312 | 2/1975 | Suzuki et al. | 260/67.5 |
| 3,875,097 | 4/1975 | Sedlak | 162/168 |
| 3,875,098 | 4/1975 | Sedlak | 162/168 |
| 3,897,333 | 7/1975 | Field et al. | 210/54 |
| 3,902,958 | 9/1975 | Breen et al. | 162/164 |
| 3,917,529 | 11/1975 | Madole et al. | 210/54 |
| 3,929,633 | 12/1975 | Visman et al. | 210/49 |
| 3,956,122 | 5/1976 | Coscia et al. | 210/54 |
| 3,968,037 | 7/1976 | Morgan et al. | 210/47 |
| 3,977,971 | 8/1976 | Quinn et al. | 210/49 |
| 3,979,348 | 9/1976 | Ballweber et al. | 210/29.4 A |
| 4,010,131 | 3/1977 | Phillips et al. | 260/29.4 A |
| 4,021,394 | 5/1977 | Tuka et al. | 260/72 R |
| 4,022,741 | 5/1977 | Tuka et al. | 260/72 R |
| 4,051,065 | 9/1977 | Venema | 138/42 |
| 4,059,552 | 11/1977 | Zweigle et al. | 260/29.6 H |
| 4,073,763 | 2/1978 | Tai | 260/29.62 |
| 4,093,542 | 6/1978 | Dahmer et al. | 210/54 |
| 4,110,520 | 8/1978 | Mayajima | 526/27 |
| 4,113,685 | 9/1978 | Hubner et al. | 210/54 |
| 4,113,688 | 9/1978 | Pearson | 260/29.6 PM |
| 4,172,066 | 10/1979 | Zweigle et al. | 128/284 |
| 4,179,370 | 12/1979 | Hubner et al. | 210/54 |
| 4,245,070 | 1/1981 | Kemp | 526/75 |
| 4,251,410 | 2/1981 | Danner et al. | 525/127 |
| 4,282,928 | 8/1981 | McDonald et al. | 166/274 |
| 4,322,330 | 3/1982 | Merz et al. | 523/221 |
| 4,363,886 | 12/1982 | Lipowski et al. | 523/336 |
| 4,382,864 | 5/1983 | Hashimoto et al. | 210/727 |
| 4,391,932 | 7/1983 | Tai | 523/337 |
| 4,405,728 | 9/1983 | Krebs et al. | 523/336 |
| 4,521,317 | 6/1985 | Candau et al. | 252/8.55 |
| 4,528,321 | 7/1985 | Allen et al. | 524/761 |
| 4,529,794 | 7/1985 | Sortwell et al. | 528/499 |
| 4,565,836 | 1/1986 | Emerson et al. | 523/346 |
| 4,585,812 | 4/1986 | Field | 523/221 |
| 4,599,379 | 7/1986 | Flesher et al. | 524/801 |
| 4,619,967 | 10/1986 | Emerson et al. | 524/801 |
| 4,681,912 | 7/1987 | Durand et al. | 524/827 |
| 4,702,844 | 10/1987 | Flesher et al. | 210/733 |
| 4,705,640 | 11/1987 | Whittaker | 210/733 |
| 4,720,346 | 1/1988 | Flesher et al. | 210/734 |
| 4,759,856 | 7/1988 | Farrar et al. | 210/734 |
| 4,789,695 | 12/1988 | Farrar et al. | 523/336 |

(List continued on next page.)

FOREIGN PATENT DOCUMENTS

| | | |
|---|---|---|
| 1204535 | 5/1986 | Canada . |
| 0102759 | 11/1984 | European Pat. Off. . |
| 0143328 | 6/1985 | European Pat. Off. . |
| 2398762 | 2/1979 | France . |
| 63-218246 | 9/1988 | Japan . |
| 841127 | 7/1960 | United Kingdom . |
| 1153207 | 5/1969 | United Kingdom . |
| 1346596 | 2/1974 | United Kingdom . |
| 1426897 | 3/1976 | United Kingdom . |
| 1489046 | 10/1977 | United Kingdom . |
| 2160879 | 1/1986 | United Kingdom . |
| 2161492 | 1/1986 | United Kingdom . |
| WO 93/03190 | 2/1993 | WIPO . |

OTHER PUBLICATIONS

Buffle et al. *Environmental Particles,* in Analytical and Physical Chemistry Series, vol. 1, Forward and Contents (1992), pub. by Lewis Publishers.

Candau et al., *Journal of Colloid and Interface Science,* vol. 101, pp. 167–183 (1984).

Miller, *The Structure of Polymers,* in Polymer Science and Engineering Series, pp. 334–337 (1966), pub. by Reinhold Publishing Corp.

Morgan et al., "How Cationic Polymer Structure Relates to Dewatering Efficency of Waste–Activated Sludges", *Adv.Chem.Ser.,* 187, pp. 235–252, (1980).

Shibahara et al., *Chemical Abstracts,* 90:7086z (1979).

"Chemistry of Acrylamide," American Cyanimid Company, 1969, p. 35–47.

*Primary Examiner*—Peter A. Hruskoci
*Attorney, Agent, or Firm*—Pennie & Edmonds LLP

[57] ABSTRACT

Mannich (alk)acrylamide microparticles are produced at high solids contents without a significant increase in bulk viscosity by inverse microemulsion polymerization and provide superior dewatering characteristics.

23 Claims, No Drawings

U.S. PATENT DOCUMENTS

| | | | |
|---|---|---|---|
| 4,835,206 | 5/1989 | Farrar et al. | 210/734 |
| 4,861,499 | 8/1989 | Neff et al. | 252/8.51 |
| 4,931,191 | 6/1990 | Braden et al. | 210/725 |
| 4,954,538 | 9/1990 | Dauplaise et al. | 523/223 |
| 4,956,399 | 9/1990 | Kozakiewicz et al. | 523/223 |
| 4,956,400 | 9/1990 | Kozakiewicz et al. | 523/223 |
| 4,968,435 | 11/1990 | Neff et al. | 210/734 |
| 5,037,863 | 8/1991 | Kozakiewicz et al. | 523/223 |
| 5,037,881 | 8/1991 | Kozakiewicz et al. | 523/223 |
| 5,041,503 | 8/1991 | Dauplaise et al. | 523/223 |
| 5,070,133 | 12/1991 | Miyajima | 524/501 |
| 5,100,951 | 3/1992 | Fillipo et al. | 524/501 |
| 5,104,552 | 4/1992 | Cicchiello et al. | 210/727 |
| 5,132,023 | 7/1992 | Kozakiewicz et al. | 210/734 |
| 5,171,781 | 12/1992 | Farrar et al. | 524/547 |
| 5,171,782 | 12/1992 | Candau et al. | 524/801 |
| 5,171,808 | 12/1992 | Ryles et al. | 526/264 |
| 5,185,601 | 2/1993 | Lowry et al. | 162/168.3 |

MANNICH ACRYLAMIDE POLYMERS

Matter enclosed in heavy brackets [ ] appears in the original patent but forms no part of this reissue specification; matter printed in italics indicates the additions made by reissue.

*This reissue application is a continuation of reissue application Ser. No. 08/274,181, filed Jul. 12, 1994, now abandoned.*

This is a divisional of co-pending application Ser. No. 07/535,791, now U.S. Pat. No. 5,037,881 filed Jun. 11, 1990 which, in turn, is a division of Ser. No. 07/428,730, now U.S. Pat. No. 4,956,399 filed Oct. 30, 1989 which in turn is a continuation-in-part of Ser. No. 07/285,927 filed Dec. 18, 1988 now abandoned.

This invention relates to high solids inverse microemulsion, Mannich acrylamide polymers and their use as flocculants. More particularly, this invention relates to compositions comprising microparticles containing (alk) acrylamide polymers substituted with tertiary aminomethyl groups and having an average particle size of from about 200 to about 4000Å in diameter.

BACKGROUND OF THE INVENTION

High molecular weight Mannich polyacrylamides (PAMS) are well known and are used in a variety of flocculant applications. A major drawback of Mannich PAMS is their tendency to cross-link. This problem becomes more severe as the polymer solids are increased. Consequently, these polymers are generally made as dilute, aqueous solutions in an attempt to slow down the rate of interpolymer cross-linking. The solids level must also be kept low, particularly for very high molecular weight Mannich PAMS, owing to the ability of these polymers to viscosify water. As a result, solids levels of very high molecular weight Mannich PAMS must generally be well below 10%, and more typically 6% or less so that the solutions can be pumped and handled conveniently.

Several approaches have been tried to overcome these problems. One approach has been to make the Mannich PAMS at the site of use by inverting high solids inverse emulsion PAMS in water containing dialkylamines and formaldehyde. U.S. Pat. Nos. 4,021,394 and 4,022,741 describe continuous processes for the preparation of Mannich PAMS which entails inverting an inverse emulsion PAM in a process stream containing formaldehyde and a secondary amine and subjecting the stream to turbulence by in-line mixing to produce a 1–15% aqueous solution of Mannich PAM. This approach, however, suffers from the need to store multiple chemicals on site and from the problems inherent in running chemical reactions at such locations. Another approach has been to prepare dry Mannich PAMS, as described in U.S. Pat. Nos. 3,864,312; 3,539,535 and 3,790,529 or blends of dry PAMS with dry, low-molecular weight Mannich-base forming compounds which, when dissolved in water, react to produce Mannich PAMS, as described in EPO Patent No. 0,210,784. These approaches, in general, suffer from cross-linking problems, the reversibility of the Mannich reaction, the difficulty and length of time required to dissolve high molecular weight polymers, and other problems. Another approach has been to make the Mannich PAM in inverse emulsions, such as described in U.S. Pat. Nos. 3,979,348; 4,093,542 and 4,010,131. While this approach produces a product with substantially higher solids, the average particle size thereof ranges from about 10,000–20,000Å in diameter, and consequently, cross-linking of the many polymer chains in each particle renders the products less effective. The cross-linking rate can be reduced somewhat by adding fairly large quantities of stabilizers, such as described in U.S. Pat. Nos. 4,113,685 and 4,073,763, but cross-linking continues and the products thus possess a very limited shelf life.

Accordingly, there exists a need for a Mannich acrylamide polymer which can be prepared at high solids levels without extensive interpolymer cross-linking such that it may be economically transported and easily handled by the end user without the need for any on-site preparation. Such a Mannich acrylamide polymer composition would satisfy a long felt need and constitute a notable advance in the art.

Surprisingly, it has now been discovered that Mannich acrylamide polymers, in the form of inverse microemulsions, give superior performance relative to the Mannich acrylamide polymers of the prior art and can be conveniently prepared at high solids content while maintaining a very low bulk viscosity. In contrast to solution and inverse emulsion Mannich acrylamide polymers of the prior art which contain large quantities of polymer molecules in the same aqueous environment, the Mannich acrylamide polymers of the present invention are isolated as individual, or at most, several, polymer molecules in each aqueous microemulsion micelle. Thus, the problem of large scale debilitating interpolymer cross-linking inherent in the solution and inverse emulsion products of the prior art is overcome.

Additionally, in contrast to the high bulk viscosities of the more stable dilute solution acrylamide polymers of the prior art, the novel microemulsion Mannich acrylamide polymers of the present invention can be made at high solids levels while still maintaining an extremely low bulk viscosity.

Even more unexpected with regard to the microemulsion Mannich acrylamide polymers of the instant invention is the fact that even though cross-linking thereof still occurs, the cross-linked polymers are capable of successfully performing as effective flocculants in the dewatering of suspended solids, whereas the cross-linked inverse emulsion and solution Mannich acrylamide polymers fail.

SUMMARY OF THE INVENTION

According to the present invention, there is provided compositions comprising (alk)acrylamide-containing polymeric microparticles, the (alk)acrylamide polymer being substituted with at least about 1 mole percent of tertiary aminomethyl groups and having an average particle size of from about 200 to about 4000Å in diameter. It is preferred that the average particle size range from about 300 to about 2000Å in diameter and even more preferred that it ranges from about 350 to 1000Å in diameter. Also provided by the present invention are microemulsions comprising the above-defined modified polymers wherein the polymer solids content is greater than 10 percent, by weight, based on said composition and, preferably, greater than 20 percent, by weight.

The above defined compositions preferably comprise polyacrylamide substituted with said aminomethyl groups.

Also, according to the present invention are provided processes for the preparation of compositions as defined above. In one embodiment, the composition is prepared by (a) admixing (i) an aqueous solution of at least one (alk)acrylamide monomer and, optionally, at least one ethylenically unsaturated comonomer;

(ii) an oil solution comprising at least one hydrocarbon liquid; and (iii) an effective amount of surfactant or surfactant mixture so as to form an inverse microemulsion;

(b) subjecting the inverse microemulsion obtained in step (a) to polymerization conditions;

(c) reacting the polymerized polymer obtained in step (b) with an effective amount of a formaldehyde and a secondary amine or a complex thereof; and (d) optionally, quaternizing the resultant polymer.

In a second embodiment, the composition is prepared by (a) reacting (i) at least one (alk)acrylamide monomer and, optionally, at least one ethylenically unsaturated comonomer; and (ii) formaldehyde and a secondary amine or a complex thereof in aqueous solution to produce a tertiary aminomethyl substituted (alk)acrylamide monomer;

(b) admixing (i) said aqueous solution of substituted (alk)acrylamide monomer and, optional comonomer obtained in (a);

(ii) an oil solution comprising at least one hydrocarbon liquid; and (iii)an effective amount of surfactant or surfactant mixture, so as to form an inverse microemulsion;

(c) subjecting the inverse microemulsion obtained in step (b) to polymerization conditions; and (d) optionally, quaternizing the resultant polymer.

A third embodiment sets forth a process for preparing the composition comprising (a) admixing (i) an aqueous solution comprising an (alk)acrylamide monomer and optionally, at least one ethylenically unsaturated comonomer, a formaldehyde and a secondary amine or a complex thereof;

(ii) an oil solution comprising at least one hydrocarbon liquid; and (iii) an effective amount of surfactant or surfactant mixture, so as to form an inverse microemulsion;

(b) subjecting the inverse microemulsion obtained in step (a) to polymerization conditions and allowing the formaldehyde and secondary amine to react with the (alk) acrylamide amide groups; and (c) optionally, quaternizing the resultant polymer.

Polymerization, according to the present invention, is carried out by the addition of a polymerization initiator or by subjecting the inverse microemulsion to ultraviolet or ionizing irradiation.

Formaldehydes useful in the practice of this invention are selected from formaldehyde, paraformaldehyde, trioxane or aqueous formalin, etc.

Useful secondary amines are selected from dimethylamine, methylethylamine, diethylamine, amylmethylamine, dibutylamine, dibenzylamine, piperidine, morpholine, ethanolmethylamine, ethanolmethylamine, diethanolamine or mixtures thereof.

Especially preferred is a process wherein the formaldehyde comprises formalin and the secondary amine comprises dimethylamine. It is also contemplated to employ a formaldehyde-secondary amine complex such as N,N-dimethylaminomethanol.

The ratio of formaldehyde to amine is not critical and can range from about 10:1 to 1:10, by mole, respectively. It is generally preferred, however, to use a molar ratio as close to 1:1 as practical. A sufficient quantity of the amine and formaldehyde or complex thereof is required to impart at least 1 mole percent of the tertiary aminomethyl groups to the acrylamide polymer.

According to the present invention there are also provided a method of releasing water from a dispersion of suspended solids which comprises (a) adding to the dispersion from about 10 to about 100,000 parts per million of a composition comprising (meth) acrylamide-containing polymeric microparticles, the (alk)acrylamide polymer being substituted with at least about 1 mole percent of tertiary aminomethyl groups and having a average particle size of from about 200 to about 4000Å in diameter; and (b) dewatering the mixture of the dispersion of suspended solids and said composition. Dispersions of suspended solids comprising sewage sludge are exemplary.

DETAILED DESCRIPTION OF THE INVENTION

Preparation of Mannich acrylamide polymers as small, aqueous, inverse microemulsion droplets or micelles allows the composition to be prepared at a high polymer solids content while substantially eliminating the detrimental interpolymer cross-linking problems inherent in inverse emulsion and solution product forms thereof and while simultaneously maintaining a low product bulk viscosity.

The compositions of this invention comprise (alk) acrylamide-containing polymeric microparticles, the (alk) acrylamide polymer being substituted with at least about 1 mole percent of tertiary aminomethyl groups and having an average particle size of from about 200 to about 4000Å in diameter and are generally prepared by an inverse microemulsion polymerization process.

The backbone of the Mannich acrylamide polymers of the present invention may comprise units of such (alk) acrylamides as acrylamide, methacrylamide, ethacrylamide and the like.

The backbones of the Mannich acrylamide polymers of the present invention may also comprise an (alk)acrylamide copolymerized with a cationic or non-ionic, water-soluble, ethylenically unsaturated comonomer in amounts up to about 90%, by weight. Water-soluble, anionic comonomers may also be used in substantially lower amounts.

Useful cationic monomers include diallyl dialkylammonium chlorides, N,N-dialkylaminoalkyl(meth)acrylates, N,N-dialkylaminoalkyl(meth)acrylamides, salts, quaternaries and mixtures thereof.

Anionic monomers useful in the practice of this invention may comprise acrylic or methacrylic acid, furmaric acid, crotonic acid; maleic acid, salts thereof 2-acrylamido-2-methylpropane sulfonic acid; styrene sulfonic acid and their salts and the like.

Water-soluble, non-ionic monomers, suitable in the practice of this invention, generally comprise N-vinyl pyrrolidone, N,N-dialkylmethacrylamides, hydroxyalkyl methacrylates; N-vinylformamide and the like. Small quantities, i.e. up to about 10%, by weight, of other copolymerizable monomers, such as methyl acrylate; methyl methacrylate; acrylonitrile; vinyl acetate; styrene etc. may also be used.

Formaldehydes suitable for use in this invention, as mentioned above, are selected from formaldehyde; paraformaldehyde; trioxane; aqueous formalin and mixtures thereof. Secondary amines suitable for use in the practice of this invention are selected from those containing from about 2 to about 8 carbon atoms which are aliphatic, cyclic, straight chained or branched.

The compositions of the present invention may be prepared using inverse microemulsion polymerization techniques. Polymerization in microemulsions and inverse microemulsions is known to those skilled in this art. P.

Speiser reported in 1976 and 1977 a process for making spherical "nanoparticles" with diameters less than 800Å by (1) solubilizing monomers, such as acrylamide and methylenebisacrylamide and other materials, such as drugs in micelles and (2) polymerizing the monomers, see J. Pharm. Sa., 65 (12), 1763 (1976) and U.S. Pat. No. 4,021,364. Both water-in-oil and oil-in-water systems can be used to prepare these nanoparticles. While not specifically called microemulsion polymerization by the author, this prior art process does contain all the features which are currently used to define microemulsion polymerization. These reports also constitute the first examples of polymerization of acrylamide in a microemulsion. Since then, numerous publications reporting polymerization of water-soluble polymers in the inverse phase of microemulsions have appeared, see, for example, U.S. Pat. Nos. 4,521,317 and 4,681,912 and [GB 2162492 A] *GB 2161492 A*., incorporated herein by reference.

In general, microemulsion polymerization processes are conducted by (i) preparing a monomer microemulsion by mixing an aqueous solution of monomers with a hydrocarbon liquid containing an appropriate surfactant or surfactant mixture to form an inverse microemulsion consisting of small aqueous monomer droplets dispersed in the continuous oil phase and (ii) subjecting the monomer microemulsion to free radical polymerization.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

Suitable monomers are non-ionic, anionic and cationic and are as defined above. The aqueous monomer solution may contain such conventional additives as are desired. For example, the solution may contain chelating agents to remove polymerization inhibitors, chain-transfer agents, pH adjusters, initiators and other conventional additives.

Essential to the formation of the microemulsion, which may be defined as a transparent and thermodynamically stable solution, comprising two liquids insoluble in each other and a surfactant, in which the micelles are usually 1000Å or less in diameter, is the selection of appropriate organic phase and surfactant.

The selection of the organic phase has a substantial effect on the minimum surfactant concentration necessary to obtain the inverse microemulsion and may consist of a hydrocarbon or hydrocarbon mixture. Isoparaffinic hydrocarbons or mixtures thereof are the most desirable in order to obtain inexpensive formulations. Typically the organic phase will comprise mineral oil, toluene, fuel oil, kerosene, odorless mineral spirits, mixtures of any of the foregoing and the like.

The ratio by weight of the amounts of the aqueous phase and hydrocarbon phase is chosen as high as possible, so as to obtain, after polymerization, a microemulsion of high polymer content. Practically, this ratio may range, for example from about 0.5 to about 3:1, and usually approximates 1:1.

The one or more surfactants are selected in order to obtain an HLB (Hydrophilic Lipophilic Balance) value ranging from about 8 to about 12. Outside this range, formation of inverse microemulsions generally cannot be attained. In addition to the appropriate HLB value, the concentration of surfactant must be optimized, i.e., sufficient to form an inverse microemulsion. Too low a concentration of surfactant leads to the formation of standard inverse emulsions and too high a concentration results in increased costs and does not impart any significant benefit. Typical surfactants useful in the practice of this invention may be anionic, cationic or nonionic. Preferred surfactants include sorbitan monooleate, polyoxyethylene (20) sorbitan monooleate, sodium dioctylsulfosuccinate, oleamidopropyldimethyl amine, sodium isostearyl-2-lactate and the like.

Polymerization of the microemulsion may be carried out in any manner known to those skilled in the art. Initiation may be effected with a variety of thermal and redox free radical initiators, including peroxides, e.g. t-butyl peroxide; azo compounds, e.g. azobisisobutyronitrile; inorganic compounds, such as potassium persulfate and redox couples, such as ferrous ammonium sulfate/ammonium persulfate. Initiator addition may be effected any time prior to the actual polymerization per se. Polymerization may also be effected by photochemical irradiation processes, such as ultraviolet irradiation or by ionizing irradiation from a cobalt 60 source.

It is possible to perform the Mannich substitution reaction at various stages in relation to the inverse microemulsion polymerization. The formaldehyde and secondary amine may be added after the inverse microemulsion polymerization of the (alk)acrylamide and then reacted with the resultant polymer to form the tertiary aminomethyl group on the (alk)acrylamide polymer backbone. It is also possible to react the (alk)acrylamide monomer with the formaldehyde and secondary amine prior to the inverse microemulsion formation and before polymerization of the monomers. Also contemplated, is adding the formaldehyde and secondary amine to the aqueous solution prior to polymerizing and then polymerizing the (alk)acrylamide monomer and carrying out the Mannich reaction.

If desired, the Mannich polymers produced by the procedures of the present invention may be quaternized as is known in the art, such as by reacting the Mannich polymers with such quaternizing agents as methyl chloride, dimethyl sulfate, benzyl chloride and the like under known conditions.

The polymers of the present invention can conveniently be employed as flocculants prepared in the form of dilute aqueous solutions. These solutions can be prepared by inverting the microemulsion into water, optionally in the presence of a breaker surfactant, or by recovering the polymer from the microemulsion, such as by stripping or by adding the microemulsion to a solvent which precipitates the polymer, e.g. isopropanol or acetone, filtering off the resultant solids, drying and redispersing in water. The microemulsion can also be stripped to increase the percentage of polymer solids thereof.

Concentrating dispersions of suspended solids is carried out by adding an effective amount of the compositions of this invention, in solution form, to the suspension to remove water there to produce an effluent of desired characteristics.

The products of this invention are useful in facilitating a wide range of solid-liquid separation operations. The cationic polymers may be used in the dewatering of biologically treated suspensions, such as sewage and other municipal or industrial sludges, the drainage of cellulosic suspension such as those found in paper production, e.g. paper waste, and the settlement of various inorganic suspensions, i.e. refinery waste, food waste etc.

DESCRIPTION OF THE PREFERRED EMBODIMENTS

The following examples illustrate the present invention. They are not to be construed to limit the claims in any manner whatsoever.

Standard Viscosity (SV) is measured by adding 50 gms of a 0.2% aqueous polymer solution to 50 gms of water, stirring the resulting mixture for 5 minutes to completely dissolve the salt, adjusting the pH to 5 and determining the viscosity at 25°±0.1° C. using a Brookfield viscometer (LVT model) with UL adapter at 50 rpm. Cationic equivalent (CEQ) is measured by the technique described in J. Chem. Ed., 62 (7), 627 (1985).

EXAMPLE 1

Microemulsion Preparation 100 gms of an aqueous solution (pH=3.5) containing 42.3 gms of acrylamide and 0.02 gm of 2-hydroxyethyl ethylenediaminetriacetic acid are pumped at the rate of 4.4 ml/min into 150 gms of an organic solution containing 128.5 gms of an isoparaffinic solvent having a b. p. of 207°–254° C. (IPS), 21.9 gms of polyoxyethylenesorbitol hepaoleate (PESH) and 7.8 gms of sorbitan sesquioleate (SS). A clear, monomer containing microemulsion is obtained.

0.0424 gms of 2,2'-axobis-4-methoxy-2,4-dimethylvaleronitrile in 2 mls of ethyl acetate is added to the monomer containing microemulsion which was previously sparged for 40 minutes using nitrogen. Polymerization is conducted at 30° C. The product is a clear, stable polyacrylamide (PAM) microemulsion (S.V.=3.8 cps).

DMAM Preparation

N,N-dimethyaminomethanol (DMAM) is prepared by slowly adding 7.7 gms of 95 percent paraformaldehyde to a 100 ml flask containing 27.50 gms of a 55 percent aqueous solution of dimethylamine and 6.60 gms of deionized water, keeping the exotherm below 45° C. The resultant DMAM solution is then filtered yielding a clear solution possessing 53.20 gms of DMAM solids.

Mannich PAM Microemulsion Preparation 30.0 gms of the above PAM microemulsion are placed in a suitable reactor. The emulsion is warmed to 30° C. Next 10.0 gms of the DMAM solution prepared above are added to the PAM microemulsion at a rate of 0.08 ml/min. with gentle stirring. The resulting Mannich PAM microemulsion is stored at ambient temperature until use. After 24 hours, the polymer has a CEQ of 5.75 meq/g and S.V. of 2.5 cps.

Free-Drainage Testing

The efficiency of dewatering a typical municipal sludge is determined as follows: 200 gms of sludge are carefully weighed into screw cap jars. Aqueous solutions of Mannich PAM flocculants are prepared by adding the microemulsion (or in the comparative examples, a solution of commercial Mannich PAM) to water so that the polymer concentration is 0.2 weight percent. Various doses of the polymer solutions are added to the sludge samples, water is added to bring the total weight to 250 gms, the mixtures are agitated for 90 seconds, the resulting flocculated sludge is poured into a Buchner funnel containing a filter cloth, and the free drainage is determined by measuring the volume of filtrate collected in 10 seconds. The results are set forth in Table 1, below.

TABLE 1

| MANNICH PAM OF EXAMPLE NO | DOSE (ml) | FILTRATE (ml) |
|---|---|---|
| 1 | 10 | 100 |
| | 12.5 | 152 |
| | 15 | 158 |
| | 17.5 | 160 |
| | 20 | 140 |
| 1C | 10 | 60 |
| | 12.5 | 120 |
| | 15 | 140 |
| | 17.5 | 160 |
| | 20 | 128 |

C = commercially available product

Table 1 clearly shows the superior performance of the Mannich PAM microemulsion of Example 1 as compared to a typical, commercially available, solution Mannich PAM.

EXAMPLES 2–7

Examples 2–7 describe the preparation of PAM microemulsions which are used for the preparation of a series of Mannich PAM microemulsions.

EXAMPLE 2

To 150 gms of an organic solution containing 128.5 g of IPS, 21.9 gms of PESH and 7.8 gms of SS are slowly added 100 gms of a pH 3.5 aqueous solution containing 42.3 g of acrylamide and 0.02 gm of N-(2-hydroxyethyl) ethylenediaminetriacetic acid with stirring. The resulting clear, monomer microemulsion is sparged for 40 minutes with nitrogen. 0.0424 gm of 2,2,-azobis-4-methoxy-2,4 dimethylvaleronitrile in 2 mls of ethyl acetate is then added and the microemulsion polymerized at 30° C. The resulting product is a clear, stable PAM microemulsion having a Standard Viscosity (S.V.) of 3.8 cps and a particle size average of 650Å (median value as measured by transmission electron microscopy).

EXAMPLE 3

The procedure of Example 2 is again followed and produces a polyacrylamide microemulsion with an S.V. of 3.7 cps.

EXAMPLES 4–6

The procedure of Example 2 is used to prepare the PAM microemulsions of Examples 4–6 with the exception that the amount of emulsifier is altered as shown in Table II, below, to vary the resultant PAM microemulsion particle size.

TABLE 2

| PAM MICRO-EMULSION | PESH-g | SS-g | PARTICLE SIZE (Å)[a] | S.V. (cps) |
|---|---|---|---|---|
| Example 4 | 18.72 | 6.66 | 590 | 3.7 |
| Example 5 | 15.60 | 5.55 | 710 | 3.5 |
| Example 6 | 12.48 | 4.44 | 960 | 3.6 |

[a]as measured by transmission electron microscopy
SV = Standard Viscosity

EXAMPLE 7

Example 7 shows the preparation of a PAM microemulsion with a different emulsifier system.

To 145 gms of an organic solution containing 120 gms of IPS, 14.82 gms of PESH and 11.12 gms of the reaction product of diethanolamine and oleic acid (DOA) are slowly added 100 gms of a pH 3.5 aqueous solution containing 42.3 gms of acrylamide and 0.02 gm of N-(2-hydroxyethyl)-ethylenediaminetriacetic acid with stirring. The resulting clear, monomer containing microemulsion is sparged for 40 minutes with nitrogen. 0.0423 gm of 2,2'-azobis-4-methoxy2,4-dimethylvaleronitrile in 2 mls of ethyl acetate are then added and the microemulsion is polymerized at 30° C. The resulting product is a clear, stable PAM microemulsion having an S.V. of 3.1 cps.

EXAMPLE 8

Example 8 describes the preparation of dimethylamine/formaldehyde (DMA/$CH_2O$) adducts used to prepare Mannich PAM microemulsions from the PAM microemulsions of Examples 2, 3, 6 and 7.

A. 10.08 gms of 95 percent paraformaldehyde are slowly added to a reaction vessel containing 26.3 gms of a 55 percent aqueous solution of dimethylamine keeping the exotherm below 45° C. The resulting solution is filtered yielding a clear solution.

B. To 30.0 gms of the solution prepared in Example 8A are added 3.05 gms of 100 percent dimethylamine with mixing, bringing the DMA/$CH_2O$ ratio from 1/1 to 1.25/1.

EXAMPLES 9–15

Examples 9–15 describe the preparation of Mannich PAM microemulsions with differing amounts of dimethylaminomethyl substitution from the PAM microemulsions of Examples 2, 3 and 6 and the DMA/$CH_2O$ ratio adduct from 8B.

30.0 gms of the PAM microemulsion from Example 2 are placed in a reaction vessel at ambient temperature. To this are slowly added 11.0 gms of the DMA/$CH_2O$ adduct from Example 8B, with stirring, yielding a clear, Mannich PAM microemulsion. After approximately 24 hours, the microemulsion is inverted into water resulting in a Mannich PAM with an S.V. of 3.9 cps and a CEQ of 6.2 meq/g. The identical procedure is used to prepare the Mannich PAM microemulsions of Examples 10– 15, which differ only in the amount of DMA/$CH_2O$ adduct charged and the PAM microemulsion, as shown in Table 3.

TABLE 3

| EXAMPLE | DMA/$CH_2O$ adduct (g) | PAM MICRO-EMULSION OF EXAMPLE NO | CEQ (meq/g) | S.V. (cps) |
|---|---|---|---|---|
| 9 | 11.0 | Ex. 2 | 6.2 | 3.9 |
| 10 | 6.6 | Ex. 2 | 3.5 | 4.8 |
| 11 | 4.4 | Ex. 2 | 3.3 | 4.6 |
| 12 | 2.2 | Ex. 2 | — | 4.1 |
| 13 | 1.1 | Ex. 3 | — | 2.7 |
| 14 | 1.5 | Ex. 3 | — | 2.7 |
| 15 | 11.0 | Ex. 6 | — | 4.1 |

EXAMPLE 16

Example 16 is a repeat of Example 8A, with the exception being a slight dilution of the clear solution to reduce the adduct concentration.

22.3 gms of 95 percent paraformaldehyde are slowly added to a vessel containing 57.78 gms of a 55 percent aqueous solution of dimethylamine keeping the exotherm below 45° C. The resulting solution is filtered yielding a clear solution. 12.30 gms of deionized water are then added.

EXAMPLES 17–19

Examples 17–19 describe the preparation of Mannich PAM microemulsions from PAM microemulsions of Examples 2, 6 and 7 and with a DMA/$CH_2O$ (1/1) adduct.

EXAMPLE 17

30.0 gms of the PAM microemulsion from Example 2 are placed in a vessel at ambient temperature. To this are slowly added 10.0 gms of the DMA/$CH_2O$ adduct of Example 16 with stirring, yielding a Mannich PAM microemulsion. After approximately 24 hours, the microemulsion is inverted into water resulting in a Mannich PAM solution with an S.V. of 3.7 cps and a CEQ of 5.6 meq/g. The identical procedure is used to prepare the Mannich PAM microemulsions of Examples 18–19 as shown in Table 4, except different PAM microemulsions are used.

TABLE 4

| EXAMPLE | DMA/$CH_2O$ adduct (g) | PAM MICRO-EMULSION OF EXAMPLE NO | CEQ (meq/g) | S.V. (cps) |
|---|---|---|---|---|
| 18 | 10.0 | Ex. 7 | 5.1 | 2.4 |
| 19 | 10.0 | Ex. 6 | 5.4 | 3.3 |

EXAMPLE 20

Example 20 describes the preparation of PAM microemulsion via redox initiation.

To 149.64 gms of an organic solution containing 128.5 gms of IPS, 21.9 gms of PESH and 7.8 gms of SS are slowly added 100 gms of a pH 3.0 aqueous solution containing 42.3 gms of acrylamide, 0.00428 gm of sodium bromate and 0.02 gm of N-(2-hydroxyethyl)ethylenediaminetriacetic acid with stirring. The resulting clear, monomer microemulsion is sparged for 40 minutes with nitrogen. $SO_2$ gas is then bubbled into the microemulsion while holding the polymerization temperature at 25° C. The resulting product is a clear, stable PAM microemulsion having an S.V. of 3.58 cps.

EXAMPLES 21–22

Examples 21 and 22 show the preparation of a morpholine/formaldehyde adduct and the Mannich PAM microemulsion prepared from this adduct.

EXAMPLE 21

10.08 gms of 95 percent paraformaldehyde are slowly added to a reaction vessel containing 27.84 gms of morpholine and 15.45 gms of water keeping the exotherm below 45° C. The resulting solution is filtered yielding a clear solution.

EXAMPLE 22

30.0 gms of the PAM microemulsion from Example 2 are placed in a vessel at ambient temperature. To this are slowly added 11.80 gms of the morpholine/$CH_2O$ adduct of Example 21 with stirring yielding a clear, Mannich PAM microemulsion. After approximately 17 days, the microemulsion is inverted into water giving a Mannich PAM solution with an S.V. of 1.4 cps and a CEQ of 3.1 meq/g.

EXAMPLE 23

Example 23 shows the preparation of a Mannich PAM microemulsion where formaldehyde and diethylamine are charged sequentially into the PAM microemulsion.

30.0 gms of the PAM microemulsion of Example 3 are placed in a vessel at ambient temperature. To this are slowly added 2.85 gms of 37.2 percent aqueous formaldehyde with stirring. Next, 2.56 gms of diethylamine are slowly added to the microemulsion with stirring, yielding a slightly hazy, Mannich PAM microemulsion. After 24 hours, the microemulsion is inverted into water giving a Mannich PAM solution having an S.V. of 2.1 cps and a CEQ of 3.0 meq/g.

EXAMPLES 24–25

Examples 24 and 25 show the preparation of a diethylamine/dimethylamine/formaldehyde (0.5/0.5/1) adduct and the Mannich PAM microemulsion prepared from this adduct.

EXAMPLE 24

10.08 gms of 95 percent paraformaldehyde are slowly added to a reaction vessel containing 12.83 gms of a 56 percent aqueous solution of dimethylamine, 11.67 gms of diethylamine and 8.32 gms of water, keeping the exotherm below 45° C. The resulting solution separates into two layers. The bottom layer, which weighs 32.6 gms is shown by NMR to be the desired diethylamine/dimethylamine/formaldehyde (0.5/0.5/1) adduct. This layer is collected and used in Example 25 to prepare a Mannich PAM microemulsion.

EXAMPLE 25

30.0 gms of the PAM microemulsion of Example 3 are placed in a vessel at ambient temperature. To this is slowly added the diethylamine/dimethylamine/formaldehyde adduct of Example 24 with stirring to yield a clear, Mannich PAM microemulsion. After approximately 24 hours, the microemulsion is inverted into water giving a Mannich PAM with an S.V. of 2.8 cps and a CEQ of 4.04 meq/g.

EXAMPLES 26–31

Examples 26–28 describe the preparation of PAM copolymer microemulsions using acrylic acid (AA), 2-acrylamido-2-methylpropanesulfonic acid (AMMPS), and diallyl dimethylammonium chloride (DADM), respectively, as the comonomers with acrylamide. Examples 29–31 describe the preparation of Mannich PAM microemulsions from these systems.

EXAMPLE 26

To 299.3 gms of an organic solution containing 240 gms of IPS, 43.78 gms of PESH and 15.5 gms of SS are slowly added 200 gms of a pH 3.15 aqueous solution containing 80.38 gms of acrylamide, 4.29 gms of acrylic acid and 0.028 gms of N-(2-hydroxyethyl)ethylenediaminetriacetic acid with stirring. The resulting clear monomer microemulsion is sparged for 40 minutes with nitrogen. 0.0424 gm of 2,2'azobis-4-methoxy-2,4-dimethylvaleronitrile, in 2 mls of ethyl acetate, are then added and the microemulsion is polymerized at 30° C. The resulting product is a clear, stable acrylamide-acrylic acid copolymer microemulsion with an S.V. of 3.48 cps.

EXAMPLE 27

To 150 gms of an organic solution containing 120.0 gms of IPS, 15.0 gms of PESH and 15.0 gms of SS are slowly added 100 gms of a pH 8.5 aqueous solution containing 31.22 gms of acrylamide, 11.18 gms of AMMPS and 0.02 gm of N-(2-hydroxyethyl)ethylenediaminetriacetic acid with stirring. The resulting monomer microemulsion is sparged for 40 minutes with nitrogen. 1.0 gm of a 4.24 percent solution of 2,2'azobis(2,4-dimethylpentane) nitrile in ethyl acetate are then added and the microemulsion is polymerized at 50° C. The resulting product is a clear, stable, acrylamide-AMMPS copolymer microemulsion with an S.V. of 3.0 cps.

EXAMPLE 28

To 137.1 gms of an organic solution containing 120 gms of decane, 14.20 gms of PESH and 2.90 gms of polyoxyethylene sorbitan monooleate (POSO) are slowly added 106.97 gms of an aqueous solution containing 17.23 gms of acrylamide, 25.92 gms of DADM and 0.02 gm of N-(2-hydroxyethyl)-ethylenediaminetriacetic acid with stirring The resulting clear, monomer microemulsion is sparged for 40 minutes with nitrogen. 0.0424 gm of 2,2'-azobis-4methoxy-2,4-dimethylvaleronitrile in 0.8 gm of ethyl acetate is then added and the microemulsion is polymerized at 30° C. The resulting product is a clear, stable acrylamide-DADM copolymer microemulsion with an S.V. of 2.3 cps.

EXAMPLE 29

30.0 gms of the acrylamide/acrylic acid copolymer microemulsion of Example 26 are placed in a vessel at ambient temperature. To this are slowly added a solution of 9.50 gms of the DMA/$CH_2O$ adduct of Example 16 and 0.36 gm of dimethylamine with stirring yielding a Mannich acrylamide-acrylic acid copolymer microemulsion. After approximately 24 hours, the microemulsion is inverted into water giving a Mannich copolymer with an S.V. of 4.1 cps and a CEQ of 6.33 meq/g.

EXAMPLE 30

30.0 gms of the acrylamide/AMMPS copolymer microemulsion of Example 27 are placed in a vessel at ambient temperature. To this are slowly added 7.06 gms of a solution of the DMA/$CH_2O$ adduct of Example 16 and 0.645 gm of dimethylamine with stirring yielding a Mannich acrylamide-AMMPS copolymer with an S.V. of 1.7 cps and a CEQ of 4.1 meq/g.

EXAMPLE 31

30.0 gms of the acrylamide/DADM copolymer microemulsion of Example 28 are placed in a vessel at ambient temperature. To this are slowly added 4.06 gms of a solution of the DMA/$CH_2O$ adduct of Example 16 and 0.41 gm of dimethylamine with stirring yielding a Mannich acrylamide-DADM copolymer microemulsion. After approximately 24 hours, the microemulsion is inverted into water giving a Mannich copolymer with an S.V. of 2.3 cps and a CEQ of 6.70 meq/g.

EXAMPLES 32–43

Examples 32–35 describe the preparation of inverse emulsion PAMS with particle sizes of 3600Å; 6600Å; 11,400Å and 20,500Å which are then converted to Mannich PAM inverse emulsions by reacting them with DMA/$CH_2O$ (1.25/1 and 1/1) adducts in Examples 36–39 and 40–43, respectively. The products of Examples 17, 19 and 40–43 are then used to determine the effect of particle size on flocculation performance.

EXAMPLES 32–35

The general procedure used to prepare the inverse emulsion PAMS is as follows: DOA and an A/B/A block copolymer of about 5000 m.w. wherein the A units comprise palmitic acid and 12-hydroxystearic acid (1:5) and the B units are polyethyleneoxide (m.w. 1500), hereinafter PHP, are dissolved in low odor paraffin solvent (OPS) to produce an oil solution. An aqueous monomer solution is prepared by dissolving a 52 percent aqueous solution of acrylamide, the disodium salt of ethylenediaminetetraacetic acid (EDTA-2Na) 2,2'-azobis(2-amidinopropane) hydrochloride and $Na_2SO_4$ in water, and then adjusting the pH to 3.0–3.5 with 10 percent sulfuric acid. The aqueous monomer solution is then added to the oil solution and emulsified. The resulting inverse emulsion is sparged with nitrogen and then initiated with UV light at 25° C. The polymerization is continued for approximately 3.5 hours. The particle size average is a median value as measured by a Horiba particle size analyzer. The composition of the inverse emulsions and the resulting polymer characteristics are shown below in Table 5.

TABLE 5

| | Example 32 | Example 33 (C) | Example 34 (C) | Example 35 (C) |
|---|---|---|---|---|
| OIL PHASE | | | | |
| OPS | 70.8 | 70.8 | 70.8 | 70.8 |
| A/E/A | 7.5 | 7.5 | 7.5 | 7.5 |
| PHP | 1.25 | 1.25 | 1.25 | 1.25 |
| Acrylamide (52%) | 86.6 | 86.6 | 86.6 | 86.6 |
| EDTA 2Na (10%) | 0.23 | 0.23 | 0.23 | 0.23 |
| $Na_2SO_4$(1.93%) | 3.58 | 3.58 | 3.58 | 3.58 |
| AQUEOUS PHASE | | | | |
| Azo Cat (2%) | 0.45 | 1.13 | 2.25 | 2.25 |
| Water | 94.5 | 93.8 | 92.7 | 92.7 |
| POLYMER | | | | |
| Conversion, % | 97.4 | 96.0 | 97.8 | 98.5 |
| S.V. cps | 3.7 | 3.6 | 3.1 | 3.3 |
| Particle size, Å | 3,600 | 6,600 | 11,400 | 22,500 |

*all components are given as grams
S.V. = standard viscosity
C = comparative

EXAMPLES 36–43

The following is a general description of the method used to prepare the Mannich PAM inverse emulsions of Examples 36–43. 30.0 gms of PAM inverse emulsion from the previous designated example is placed in a vessel at ambient temperature. To this is slowly added a solution of DMA/$CH_2O$ adduct with stirring yielding a stable Mannich PAM inverse emulsion. After several days, the Mannich PAM inverse emulsion is inverted into water giving a Mannich PAM and the S.V. and the CEQ are determined. The compositions of the examples and the resulting characteristics are shown in Table 6, below.

TABLE 6

| EX-AMPLE | Inverse Emul of Ex No | DMA/$CH_2O$ RATIO | at DMA/$CH_2O$ (g) | Polymer S.V. (cps) | Polymer CEQ (meq/g) |
|---|---|---|---|---|---|
| 36 | 32 | 1.25 | 11.0 | 3.9 (3 days) | 5.7 |
| 37 | 33 | 1.25 | 11.0 | 3.8 (3 days) | 6.0 |
| 38 | 34 | 1.25 | 11.0 | 3.7 (3 days) | 6.3 |
| 39 | 35 | 1.25 | 11.0 | 3.9 (3 days) | 5.8 |
| 40 | 32 | 1.0 | 10.0 | 3.9 (2 days) | 5.2 |
| 41 | 33 | 1.0 | 10.0 | 3.8 (2 days) | 4.9 |

TABLE 6-continued

| EX-AMPLE | Inverse Emul of Ex No | DMA/$CH_2O$ RATIO | at DMA/$CH_2O$ (g) | Polymer S.V. (cps) | Polymer CEQ (meq/g) |
|---|---|---|---|---|---|
| 42 | 34 | 1.0 | 10.0 | 3.2 (2 days) | 5.5 |
| 43 | 35 | 1.0 | 10.0 | 3.9 (2 days) | 5.3 |

EXAMPLE 44

The performance of the Mannich PAM microemulsion of Example 9 is determined by free-drainage sludge dewatering tests as follows: 200 gms of sewage sludge from the Stamford, Ct. waste treatment plant is carefully weighed into screw cap jars. Aqueous solutions of Mannich PAM flocculant are prepared so that the concentration of polymer is 0.2%. Various doses of the solutions are added to the sludge samples, the sludge is agitated for 90 seconds, the resulting flocculated sludge is poured into a Buchner funnel containing a filter cloth, and the free drainage is determined by measuring the volume of filtrate collected in 10 seconds. The improved performance of Mannich PAM microemulsion from Example 9 (10 days old) compared to a commercially available Mannich PAM is clearly seen in Table 7.

TABLE 7

| Mannich PAM of Example No | Dose (ml) | Filtrate (ml) |
|---|---|---|
| 9 | 9.5 | 70 |
| | 10.5 | 108 |
| | 11.0 | 135 |
| | 12.5 | 125 |
| | 13.0 | 125 |
| | 15.0 | 105 |
| 9C | 11.5 | 65 |
| | 12.5 | 85 |
| | 13.0 | 85 |
| | 15.0 | 98 |
| | 16.5 | 120 |
| | 17.5 | 125 |
| | 20.0 | 128 |

C = commercially available product

EXAMPLE 45

The significance of particle size on performance is determined by free-drainage testing of the aged (72 day old) microemulsions and inverse emulsions as shown in Table 8, below. The test results clearly show the increase in flocculant dose required as the particle size increases.

TABLE 8

| Emulsion of Example No | Micelle Size (Å) | Aged Polymer S.V. (cps) | Aged Polymer CEQ (meq/g) | Dose (ml) | Filtrate (ml) |
|---|---|---|---|---|---|
| 17 | 650 | 1.2 | 5.5 | | |
| 19 | 960 | 1.1 | 5.4 | | |
| 40 | 3.600 | 1.2 | <0.2 | | |
| 41 | 6.600 | 1.1 | <0.2 | | |
| 42 | 10.40O | 1.1 | <0.2 | | |
| 43 | 20.500 | 1.1 | <0.2 | | |
| 17 | | | | 15 | 120 |
| | | | | 17.5 | 160 |
| | | | | 20 | 165 |
| | | | | 22.5 | 160 |

TABLE 8-continued

| Emulsion of Example No | Micelle Size (Å) | Aged Polymer S.V. (cps) | Aged Polymer CEQ (meq/g) | Dose (ml) | Filtrate (ml) |
|---|---|---|---|---|---|
| 19 | | | | 15 | 90 |
| | | | | 17.5 | 145 |
| | | | | 20 | 170 |
| | | | | 22.5 | 180 |
| 40 | | | | 20 | 100 |
| | | | | 22.5 | 135 |
| | | | | 25 | 180 |
| | | | | 30 | 180 |
| 41C | | | | 20 | 55 |
| | | | | 30 | 100 |
| | | | | 35 | 165 |
| | | | | 37.5 | 180 |
| | | | | 40 | 185 |
| 42C | | | | 30 | 128 |
| | | | | 32.5 | 148 |
| | | | | 35 | 175 |
| | | | | 40 | 185 |
| 43C | | | | 30 | 98 |
| | | | | 40 | 130 |
| | | | | 50 | 175 |

C = comparative

EXAMPLE 46

The procedure of Example 1 is again followed except that the Mannich PAM microemulsion is subjected to treatment with dimethyl sulfate to quaternize the Mannich PAM. A quaternized polymer is recovered.

EXAMPLE 47

The procedure of Example 1 is again followed except that the acrylamide is replaced by an equivalent amount of methacrylamide. Substantially identical results are achieved.

EXAMPLE 48

The procedure of Example 27 is again followed, except that the AMMPS is replaced by 1-methacryloyl-4-methyl piperazine. Treatment of the resultant polymer as in Example 30 produces a similar Mannich copolymer.

EXAMPLE 49

To 246.05 grams of an organic solution containing IPS (199.7 gms), PESH.(31.6 gms) and SS (13.9 gms) are slowly added 242.5 gms of a pH 3.0 aqueous solution containing acrylamide (109.8 gms) sodium bromate (0.0055 g) and N-(2-hydroxyethyl)ethylenediaminetriacetic acid (0.10 g) with stirring. The resulting, slightly cloudy, monomer microemulsion is sparged for 40 minutes with nitrogen. $SO_2$ gas is then bubbled into the resultant microemulsion and the polymerization temperature kept at 55° C. The $SO_2$ gas is prepared by passing nitrogen gas through a 0.5% sodium metabisulfite solution. The resulting product is a clear, stable, polyacrylamide microemulsion having an S.V. of 2.7 cps.

EXAMPLE 50

A. Paraformaldehyde (92.4 gms, 95%) is slowly added to a suitable vessel containing a dimethylamine (218.4 gms, 60.4% aqueous solution) while keeping the exotherm below 45° C. The resulting solution is allowed to cool with stirring and is then filtered yielding a clear solution.

B. To 70.0 gms of the product of Example 50A are added 17.13 gms of deionized water.

C. To 190.0 gms of the product of Example 50A are added 15.04 gms of dicyanadiamide, 18.62 gms of sodium bisulfite, and 12.86 gms deionized water. The solution is filtered yielding a clear solution.

EXAMPLE 51

150 gms of the PAM microemulsion of Example 49 are placed in a reaction vessel at ambient temperature. To this are slowly added 62.7 gms of the DMA/$CH_2O$ adduct from Example 50B, with stirring, yielding a hazy, Mannich PAM microemulsion. After approximately 24 hours, the microemulsion is inverted into water giving a Mannich PAM with an S.V. of 2.65 cps and a CEQ of 6.6 meg/g.

EXAMPLE 52

150 gms of the PAM microemulsion of Example 49 are placed in a reaction vessel at ambient temperature. To this are slowly added 62.7 gms of the DMA/$CH_2O$ adduct from Example 50C, with stirring, yielding a clear, Mannich PAM microemulsion. After approximately 24 hours, the microemulsion is inverted into water giving a Mannich PAM with an S.V. of 2.65 cps and a CEQ of 6.2 meg/g.

EXAMPLE 53

75 gms of the Mannich PAM microemulsion of Example 52 are placed in a pressure reactor mounted on a shaker. To this are added 8.5 gms of methylchloride at ambient temperature over a period of approximately 2 hours, keeping the pressure of the reactor under 30 psi. The resulting product is a clear, stable, quaternized Mannich PAM having an S.V. of 2.1 cps.

EXAMPLE 54

50 gms of the Mannich PAM microemulsion of Example 52 are placed in a pressure reactor mounted on a shaker. To this are added 4.5 gms of methylchloride at ambient temperature over a period of approximately 2 hours, keeping the pressure of the reactor under 30 psi. The resulting product is a clear, stable, quaternized Mannich PAM having an S.V. of 2.2 cps.

EXAMPLE 55

50 gms of the Mannich PAM microemulsion of Example 52 are placed in a pressure reactor mounted on a shaker. To this are added 2.9 gms of methylchloride at ambient temperature over a period of approximately 2 hours, keeping the pressure of the reactor under 30 psi. The resulting product is a clear, stable, quaternized Mannich PAM having an S.V. of 2.4 cps.

EXAMPLE 56

50 gms of the Mannich PAM microemulsion of Example 51 are placed in a pressure reactor mounted on a shaker. To this are added 6.0 gms of methylchloride at ambient temperature over a period of approximately 2 hours, keeping the pressure of the reactor under 30 psi. The resulting product is a clear, stable, quaternized Mannich PAM having an S.V. of 1.8 cps.

EXAMPLE 57

150 gms of the PAM microemulsion of Example 49 are placed in a reaction vessel at ambient temperature. To this are slowly added 25.1 gms of the DMA/$CH_2O$ adduct from Example 50C, with stirring, yielding a hazy, Mannich PAM microemulsion. After approximately 24 hours, the microemulsion is inverted into water giving a Mannich PAM with an S.V. of 2.65 cps.

EXAMPLE 58

50 gms of the Mannich PAM microemulsion of Example 57 are placed in a pressure reactor mounted on a shaker. To this are added 2.7 gms of methylchloride at ambient temperature over a period of approximately 2 hours, keeping the pressure of the reactor under 30 psi. The resulting product is a clear, stable, quaternized Mannich PAM having an S.V. of 1.4 cps.

EXAMPLE 59

The performance of the quaternized Mannich PAMs of Examples 53–56 and 58 is determined by free drainage sludge dewatering tests as follows: 200 gms of sewage sludge from a municipal waste treatment plant are carefully weighed into jars. Aqueous solutions of the quaternized Mannich PAM flocculant are prepared so that the concentration of polymer is 0.2%. Various doses of the resultant solutions are added to the sludge samples, the sludge agitated for 5 seconds at 300 rpm with an overhead mixer, the resulting flocculated sludge poured into a Buchner funnel containing a filter cloth and the free drainage determined by measuring the milliliters of filtrate collected in 10 seconds. The efficacy of the quaternized polymers (QP) as flocculants is clearly seen in Table 9, below, where they are compared to a commercially available cationic flocculant with similar charge.

TABLE 9

| QP of Example | Dosage (lbs/ton) | Filtrate Vol (ml) |
|---|---|---|
| 53 | 3.72 | 140 |
| | 5.58 | 155 |
| | 7.44 | 155 |
| | 9.30 | 160 |
| 54 | 3.72 | 140 |
| | 5.58 | 155 |
| | 7.44 | 155 |
| | 9.30 | 160 |
| 55 | 3.72 | 145 |
| | 5.58 | 155 |
| | 7.44 | 170 |
| | 9.30 | 165 |
| 56 | 3.72 | 130 |
| | 5.58 | 155 |
| | 7.44 | 165 |
| | 9.30 | 170 |
| 58 | 3.72 | 48 |
| | 5.58 | 50 |
| | 7.44 | 60 |
| | 9.30 | 95 |
| | 11.16 | 110 |
| | 13.02 | 115 |
| | 14.88 | 120 |
| | 16.74 | 128 |
| Comm | 1.86 | 125 |
| | 3.72 | 140 |
| | 5.88 | 148 |
| | 7.44 | 148 |

Comm = Commercially available copolymer of acrylamide and acryloxyethyltrimethylammonium chloride (45/55)

Following the testing procedure set forth above, (Example 59) except where modified as indicated, other quaternary polymers falling within the scope of the instant invention are tested as flocculants. The results are set forth in Table 10, below.

TABLE 10

| QP of Example | Dosage (lbs/ton) | Filtrate Vol (ml) | Cake Solids |
|---|---|---|---|
| | Sludge #2 | | |
| 46 (S.V. = 1.2)[1] | 25.0 | 140 | 21.2 |
| | 27.5 | 148 | 21.0 |
| | 30.0 | 142 | 21.5 |
| | 32.5 | 136 | 21.1 |
| Comm[1] | 22.5 | 114 | 19.7 |
| | 25.0 | 142 | 19.9 |
| | 27.5 | 134 | 20.6 |
| | 30.0 | 142 | 18.6 |
| | Sludge #3 | | |
| 46 (S.V. = 2.0)[2] | 40.0 | 130 | 10.5 |
| | 48.0 | 126 | 10.5 |
| | 56.0 | 128 | 10.7 |
| 46 (S.V. = 1.2)[2] | 40.0 | 131 | 10.2 |
| | 48.0 | 134 | 10.8 |
| | 56.0 | 134 | 11.4 |
| Comm[2] | 24.0 | 125 | 9.1 |
| | 32.0 | 120 | 8.3 |
| | 40.0 | 108 | 8.8 |
| | Sludge #4 | | |
| 46 (S.V. = 1.45) | 1.4 | 14 | ** |
| | 2.7 | 33 | 37.1 |
| | 4.1 | 65 | 41.4 |
| | 5.4 | 80 | 42.0 |
| | 6.8 | 90 | 41.3 |
| Comm | 1.4 | 22 | ** |
| | 2.7 | 58 | 39.5 |
| | 4.1 | 45 | 32.9 |
| | 5.4 | 37 | 30.2 |
| | Sludge #5 | | |
| 46 (S.V. = 2.0)[3] | 8.23 | 160 | 14.8 |
| | 12.35 | 205 | 15.3 |
| | 16.46 | 220 | 15.8 |
| | 20.58 | 230 | 16.3 |
| | 24.69 | 230 | 16.9 |
| 46 (S.V. = 2.4)[3] | 8.23 | 130 | 14.2 |
| | 12.35 | 210 | 15.3 |
| | 16.46 | 220 | 16.0 |
| | 20.58 | 235 | 16.5 |
| | 24.69 | 236 | 16.7 |
| Comm[3] | 8.23 | 160 | 14.1 |
| | 10.29 | 200 | 14.7 |
| | 12.35 | 208 | 15.0 |
| | 16.46 | 226 | 15.1 |
| | 20.58 | 214 | 14.7 |
| | Sludge #6 | | |
| 53 (S.V. = 2.4) | 6.3 | 134 | 22.5 |
| | 8.4 | 158 | 24.4 |
| | 10.5 | 152 | 23.4 |
| | 12.6 | 160 | 24.5 |
| Comm.*** | 4.2 | 146 | 21.2 |
| | 5.3 | 143 | 21.2 |
| | 6.3 | 145 | 21.5 |

| | Shear | Dosage | Filtrate | Cake |
|---|---|---|---|---|
| | Sludge #7 | | | |
| 46 (S.V. = 2.5) | 300 rpm/5 min | 10 | 70 | 13.1 |
| | 300 rpm/10 min | 10 | 85 | 13.3 |
| | 300 rpm/5 min | 11.7 | 98 | 14.0 |
| | 300 rpm/10 min | 11.7 | 88 | 13.3 |
| | 300 rpm/10 min | 13.3 | 95 | 14.0 |
| | 300 rpm/10 min | 15.0 | 100 | 14.6 |
| Comm | 300 rpm/8 min | 6.7 | 82 | 12.8 |
| | 300 rpm/15 min | 6.7 | 70 | 13.0 |
| | 300 rpm/5 min | 8.3 | 70 | 12.3 |
| | 300 rpm/10 min | 8.3 | 85 | 13.0 |
| | 300 rpm/15 min | 8.3 | 82 | 13.9 |
| | 300 rpm/15 min | 10.0 | 95 | 13.8 |

TABLE 10-continued

| | | | |
|---|---|---|---|
| 300 rpm/15 min | 11.7 | 92 | 12.6 |
| 300 rpm/30 min | 11.7 | 89 | 14.1 |

[1]10 sec at 300 rpm agitation
[2]mears are at 5½ for 10 sec and 2½ for 20 sec
**not measurable
[3]350 rpm/20 sec agitation
***300 rpm/15 sec agitation The above mentioned patents and publications are incorporated herein by reference.

Many variations of the present invention will suggest themselves to those skilled in this art in light of the above detailed description. For example, instead of employing acrylamide as the (alk)acrylamide monomer; methacrylamide and ethacrylamide may be used. Polymerization may be initiated by any known method such as ionizing radiation in addition to ultraviolet or redox initiation. A wide variety of secondary amines are suitable for use in the Mannich reaction such as piperidine, diethanolamine, dibutylamine and amylmethylamine; as are a wide variety of formaldehydes, including trioxane.

All such obvious modification are within the full intended scope of the appended claims.

Although the above discussion is directed primarily to the use of (meth)acrylamide-based polymers which before reaction are substantially linear, it is also possible to use lightly to moderately cross-linked (meth)acrylamide-based polymers which can be prepared by adding small amounts of cross-linking monomers, such as methylenebisacrylamide etc., to the aqueous acrylamide monomer solutions of either of the processes described above prior to polymerization.

We claim:

[1. A method of concentrating dispersion of suspended solids which comprises (a) dewatering a dispersion of suspended solids by adding to said dispersion from about 10 to about 100,000 parts per million of a composition comprising (alk)acrylamide-containing polymeric microparticles, said (alk)acrylamide polymeric microparticles being substituted with at least about 1 mole percent of tertiary aminomethyl groups and having an average particle size of from about 200 to about 4000Å in diameter wherein crosslinking of said polymeric microparticles occurs in said composition, and said polymeric microparticles are effective flocculants in the dewatering of said suspended solids and separating the resultant concentrated dispersion.]

[2. A method as defined in claim 1 wherein said dispersion comprises a biologically treated suspension.]

[3. A method as defined in claim 1 wherein said average particle size is from about 300–2000Å in diameter.]

[4. A method as defined in claim 1 wherein said average particle size is from about 350–2000Å in diameter.]

[5. A method according to claim 1 wherein said (alk) acrylamide is acrylamide.]

[6. A method as defined in claim 1 wherein said dispersion comprises paper waste, refinery waste or food waste.]

[7. A method according to claim 1 wherein said tertiary aminomethyl groups are quaternized.]

*8. In a method of dewatering suspended solids by the addition to said suspended solids of an effective amount of a Mannich (alk)acrylamide-based polymer substituted with at least about 1 mole percent of tertiary aminomethyl groups, which polymer undergoes extensive interpolymer cross-linking, the improvement comprising preparing said polymer in the form of polymer micelles having an average particle size of from about 200 to about 4,000 Å in diameter, said polymer micelles being derived from a microemulsion.*

*9. A method as defined in claim 8 wherein said suspended solids comprise a biologically treated suspension.*

*10. A method as defined in claim 8 wherein said average particle size is from about 300 to about 2000 Å in diameter.*

*11. A method as defined in claim 8 wherein said average particle size is from about 350 to about 1000 Å in diameter.*

*12. A method as defined in claim 8 wherein said (alk) acrylamide is acrylamide.*

*13. A method as defined in claim 8 wherein said suspended solids comprise paper waste, refinery waste or food waste.*

*14. A method as defined in claim 8 wherein said Mannich acrylamide-based polymer is quaternized.*

*15. A method as defined in claim 8 wherein the polymer is added to said suspended solids as an aqueous solution.*

*16. A method as defined in claim 8 wherein the polymer is added to said suspended solids as an aqueous solution prepared by recovering the polymer from said polymer micelles and dispersing the polymer into water.*

*17. A method as defined in claim 16 wherein the polymer is recovered from the polymer micelles by precipitating the polymer from the polymer micelles, filtering off the resultant solids and drying the solids to recover the polymer.*

*18. A method as defined in claim 17 wherein the polymer is precipitated from the polymer micelles by adding the polymer micelles to a solvent selected from isopropanol and acetone.*

*19. A method as defined in claim 8 wherein the polymer solids content of the microemulsion is greater than 10 percent by weight.*

*20. A method as defined in claim 8 wherein the amount of polymer added to said suspended solids is about 10 to about 100,000 parts per million.*

*21. In a method of dewatering suspended solids by the addition of said suspended solids of an effective amount of a Mannich (alk)acrylamide-based polymer substituted with at least about 1 mole percent of tertiary aminomethyl groups, which polymer undergoes extensive interpolymer cross-linking, the improvement comprising preparing said polymer in the form of polymer micelles derived from a microemulsion, said polymer micelles having an average particle size of from about 200 to about 4,000 Å in diameter, and thus preventing said cross-linking.*

*22. The method of claim 21 wherein the polymer micelles are formed by:*

*a. admixing*
  *i. an aqueous solution of at least one (alk)acrylamide monomer and, optionally, at least one ethylenically unsaturated comonomer;*
  *ii. an oil solution comprising at least one hydrocarbon liquid; and*
  *iii. an effective amount of surfactant or surfactant mixture so as to form an inverse microemulsion*
*b. subjecting the inverse microemulsion obtained in step (a) to polymerization conditions; and*
*c. reacting the polymerized polymer obtained in step (b) with an effective amount of a formaldehyde and a secondary amine or a complex thereof; and*
*d. optionally, quaternizing the resultant polymer.*

*23. The method of claim 21 wherein the polymer micelles are formed by:*

*a. reacting*
  *i. at least one (alk)acrylamide monomer and, optionally, at least one ethylenically unsaturated comonomer; and*
  *ii. a formaldehyde and a secondary amine or a complex thereof in aqueous solution to produce a Mannich (alk)acrylamide monomer;*

*b. admixing*

*i. an aqueous solution of at least one said (alk) acrylamide monomer and optional comonomer obtained in (a);*

*ii. an oil solution comprising at least one hydrocarbon liquid; and*

*iii. an effective amount of surfactant or surfactant mixture so as to form an inverse microemulsion;*

*c. subjecting the inverse microemulsion obtained in step (b) to polymerization conditions; and*

*d. optionally, quaternizing the resultant polymer.*

*24. The method of claim 21 wherein the polymer micelles are formed by:*

*a. admixing*

*i. an aqueous solution comprising an (alk)acrylamide monomer and, optionally, at least one ethylenically unsaturated comonomer a formaldehyde and a secondary amine or a complex thereof;*

*ii. an oil solution comprising at least one hydrocarbon liquid; and*

*iii. an effective amount of surfactant or surfactant mixture, so as to form an inverse microemulsion;*

*b. subjecting the inverse microemulsion obtained in step (a) to polymerization conditions and allowing the formaldehye and secondary amine to react with (alk) acrylamide amide groups; and*

*c. optionally, quaternizing the resultant polymer.*

*25. The method of claim 21, 22, 23 or 24 wherein the polymer micelles have an average particle size of from about 300 to about 2000 Å in diameter.*

*26. The method of claim 21, 22, 23 or 24 wherein the polymer micelles have an average particle size of from about 350 to about 1000 Å in diameter.*

*27. The method of claim 21 wherein the polymer is added to said suspended solids as an aqueous solution prepared by inverting the polymer micelles into water, optionally in the presence of a breaker surfactant.*

*28. The method of claim 21 wherein the polymer is added to said suspended solids as an aqueous solution prepared by recovering the polymer from the polymer micelles and dispersing the polymer into water.*

*29. The method of claim 22, 23 or 24 wherein said (alk)acrylamide monomer comprises acrylamide, said formaldehyde composes formalin, and said secondary amine comprises dimethylamine.*

*30. The method of claim 21 wherein the amount of polymer added to said suspended solids is about 10 to 10,000 parts per million.*

* * * * *